US011992023B2

(12) United States Patent
Odinot et al.

(10) Patent No.: US 11,992,023 B2
(45) Date of Patent: May 28, 2024

(54) FERMENTED MILK SOFT CHEESE PRODUCT AND PROCESS OF MAKING SAME

(71) Applicant: Chr. Hansen A/S, Hoersholm (DK)

(72) Inventors: Jean-Marie Odinot, Arpajon (FR); Emilien Langevin, Arpajon (FR); Luciana Jimenez, Arpajon (FR); Kasui Tang, Arpajon (FR); Vera Kuzina Poulsen, Hoersholm (DK); Elahe Ghanei Moghadam, Hoersholm (DK); Gunnar Oeregaard, Hoersholm (DK)

(73) Assignee: Chr. Hansen A/S, Hoersholm (DK)

( * ) Notice: Subject to any disclaimer, the term of this patent is extended or adjusted under 35 U.S.C. 154(b) by 580 days.

(21) Appl. No.: 17/266,392

(22) PCT Filed: Aug. 6, 2019

(86) PCT No.: PCT/EP2019/071087
§ 371 (c)(1),
(2) Date: Feb. 5, 2021

(87) PCT Pub. No.: WO2020/030625
PCT Pub. Date: Feb. 13, 2020

(65) Prior Publication Data
US 2021/0307346 A1 Oct. 7, 2021

(30) Foreign Application Priority Data

Aug. 7, 2018 (EP) .................................... 18187728

(51) Int. Cl.
| A23C 9/123 | (2006.01) |
| A23C 9/133 | (2006.01) |
| A23C 9/137 | (2006.01) |
| A23C 9/142 | (2006.01) |
| A23C 19/076 | (2006.01) |

(52) U.S. Cl.
CPC .......... *A23C 9/1236* (2013.01); *A23C 9/1234* (2013.01); *A23C 9/133* (2013.01); *A23C 9/137* (2013.01); *A23C 9/1422* (2013.01); *A23C 19/076* (2013.01); *A23V 2400/137* (2023.08); *A23V 2400/231* (2023.08); *A23V 2400/249* (2023.08); *A23V 2400/31* (2023.08)

(58) Field of Classification Search
CPC ..... A23C 9/1236; A23C 9/1234; A23C 9/133; A23C 9/137; A23C 9/1422; A23C 19/076; A23V 2400/231; A23V 2400/31; A23V 2400/249; A23V 2400/137
See application file for complete search history.

(56) References Cited

U.S. PATENT DOCUMENTS

| 4,397,878 A * | 8/1983 | Koide .................... A23C 20/00 426/585 |
| 6,183,802 B1 * | 2/2001 | Silva .................... A23C 9/1234 426/321 |
| 6,217,917 B1 * | 4/2001 | Bodor .................. A23C 9/1504 426/582 |
| 6,689,402 B1 | 2/2004 | Nauth et al. |
| 2006/0057704 A1 * | 3/2006 | Schlothauer .......... A23L 33/135 435/252.9 |
| 2008/0107767 A1 * | 5/2008 | Hueting ................. A23K 10/16 426/583 |
| 2009/0068310 A1 * | 3/2009 | Bot .......................... A23C 9/13 426/39 |
| 2013/0011516 A1 * | 1/2013 | Griffin .................... A23C 19/11 435/252.9 |
| 2013/0202737 A1 * | 8/2013 | Hassan ................ A23C 19/054 426/582 |
| 2013/0273202 A1 * | 10/2013 | Wolfschoon-Pombo .................... A23C 19/0921 426/582 |
| 2015/0289531 A1 * | 10/2015 | Jukkola .................. A23C 13/16 426/582 |
| 2018/0014550 A1 * | 1/2018 | Hoffmann .......... A23C 19/0285 |

FOREIGN PATENT DOCUMENTS

CN 108094560 A 6/2018

OTHER PUBLICATIONS

BacDive. No date provided. https://bacdive.dsmz.de/strain/6820.*
Perry et al: "Effect of Exopolysaccharide-Producing Cultures on Moisture Retention in Low Fat Mozzarella Cheese", Journal of Dairy Science, vol. 80, No. 5, May 1, 1997, pp. 799-805.
Petersen et al: "Influence of Capsular and Ropy Exopolysaccharide-Producing *Streptococcus thermophilus* on Mozzarella Cheese and Cheese Whey", Journal of Dairy Science, vol. 83, No. 9, Sep. 1, 2000, pp. 1952-1956.

* cited by examiner

*Primary Examiner* — Anthony J Weier
(74) *Attorney, Agent, or Firm* — Foley & Lardner LLP

(57) ABSTRACT

The present invention relates to a process for producing a fermented milk soft cheese product including the steps of a) Providing a first milk base, b) Optionally subjecting the first milk base to a concentration step to obtain a concentrated first milk base, c) Adding a first starter culture including at least one EPS producing lactic acid bacterium strain, d) Fermenting the concentrated first milk base for a period of time until a target pH is reached to obtain an EPS-containing fermented milk composition, e) Mixing the EPS-containing fermented milk composition with one or more other ingredients, if any, selected from the group consisting of a milk fat composition, a second fermented milk composition and one or more additives, to obtain a fermented milk mixture, and f) Subjecting the fermented milk mixture to heat treatment to obtain a fermented milk soft cheese product.

17 Claims, No Drawings

FERMENTED MILK SOFT CHEESE PRODUCT AND PROCESS OF MAKING SAME

CROSS-REFERENCE TO RELATED APPLICATIONS

The present application is the U.S. National Stage of International Application PCT/EP2019/071087 filed Aug. 6, 2019, and claims priority to European Patent Application No. 18187728.3 filed Aug. 7, 2018.

FIELD OF THE INVENTION

The present invention relates to a process for producing a fermented milk soft cheese product, such as cream cheese.

BACKGROUND OF THE INVENTION

Cream cheese is an unripened, soft, fresh acid cheese curd. It is white to cream colored, mildly acidic with diacetyl flavor obtained with a mesophilic culture fermentation. Cream cheese is consumed all over the world as appetizer, topping sauce, and spreads for crackers, bagels and bread. It is also used as main ingredient in cheese cake manufacture and other baked foods. The product is usually salty but it is also produced with a sweet flavor. It typically contains at least 30% milk fat and a maximum of 55% moisture and has a pH of between 4.4 and 4.9

Cream cheese is traditionally produced by a process comprising the steps of fermenting a high-fat milk base with a starter culture containing a *Lactococcus lactis* subsp. *lactis/cremoris* strain and optionally a *Leuconostoc* strain, such as a *Leuconostoc mesenteroides* strain, concentrating the fermented milk composition, subsequently adding ingredients including e.g. milk fat, texturizing agents, such as gums, e.g. xanthan, guar and locust gums, and flavors, subjecting the mixture obtained to heat treatment and homogenization to obtain a cream cheese. It is required to use texturizing additives in order to obtain the texture required for cream cheese.

WO2005/074694 discloses a composition for forming cheese, e.g. soft cheese, comprising a starter acidification culture and an exopolysaccharide (EPS) fermentation culture containing an EPS producing strain, e.g. *Streptococcus thermophilus* V3, *Lactococcus lactis* spp. *cremoris* 332, *Lactobacillus Sakei* 570, and *Leuconostoc mesenteroides* 808.

There is a need for providing an improved process for producing cream cheese, wherein the content of texturizing agents is reduced or wherein texturizing additives are avoided completely.

SUMMARY OF THE INVENTION

The present invention has provided an improved process for producing a fermented milk soft cheese product comprising the steps of
a) Providing a first milk base,
b) Optionally subjecting the first milk base to a concentration step to obtain a concentrated first milk base,
c) Adding a first starter culture comprising at least one EPS producing lactic acid bacterium strain,
d) Fermenting the concentrated first milk base for a period of time until a target pH is reached to obtain an EPS-containing fermented milk composition,
e) Mixing the EPS-containing fermented milk composition with one or more other ingredients, if any, selected from the group consisting of a milk fat composition, a second fermented milk composition and one or more additives, to obtain a fermented milk mixture, and
f) Subjecting the fermented milk mixture to heat treatment to obtain a fermented milk soft cheese product.

The present invention is based on the innovative idea that it will be possible to produce cream cheese using i.a. exopolysaccharide (EPS) producing lactic acid bacterium strains to obtain a EPS containing fermented milk composition with high texture and to hence reduce or avoid completely the use of other texturizing additives. The present invention is further based on experimental results, which have demonstrated that by using EPS producing strains it is indeed possible to reduce the use of texturizing agents to a significant degree or even avoid the use of texturizing agents.

DEPOSITS and EXPERT SOLUTION

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32861.

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32862.

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32863.

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32864.

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32865.

The strain *Leuconostoc mesenteroides* deposited at the Leibniz Institute DSMZ-German Collection of Microorganisms and Cell Culture (DSMZ), Inhoffenstr. 7B, 38124 Braunschweig, Germany on 2018 Jul. 11 under the accession number DSM 32866.

The strain *Lactococcus lactis* subsp. *lactis* deposited at the Leibniz Institute DSMZ-German Collection of Microorganisms and Cell Culture (DSMZ), Inhoffenstr. 7B, 38124 Braunschweig, Germany on 2011 Mar. 15 under the accession number DSM 24650.

The deposits have been made under the conditions of the Budapest Treaty on the International Recognition of the Deposit of Microorganisms for the Purposes of Patent Procedure.

The Applicant requests that a sample of the deposited microorganisms should be made available only to an expert approved by the Applicant.

DETAILED DISCLOSURE OF THE INVENTION

First Aspect of the Invention: Using an EPS-Containing Fermented Milk Composition as Sole Milk-Derived Soft Cheese Base In a first aspect of the invention, neither any milk fat composition nor any second fermented milk composition is added in the process.

In other words, in the first aspect of the invention the soft cheese is composed of the EPS-containing fermented milk composition as the sole milk-derived soft cheese base. Hence, all milk fat contained in soft cheese produced originate from the EPS-containing fermented milk composition. In this context the term "soft cheese base" means any composition derived from a milk base.

First Milk Base

The term "milk" is to be understood as the lacteal secretion obtained by milking any mammal, such as a cow, a sheep, a goat, a buffalo or a camel. In a preferred embodiment, the milk is cow's milk. The term milk also includes protein/fat solutions made of plant materials, e.g. soy milk and grain milk, including oat milk and wheat milk.

The term "milk base" may be any raw and/or processed milk material that can be subjected to fermentation according to the method of the invention. Thus, useful milk bases include, but are not limited to, solutions/suspensions of any milk or milk like products comprising protein, such as whole or low fat milk, skim milk, buttermilk, reconstituted milk powder, condensed milk, dried milk, whey, whey permeate, lactose, mother liquid from crystallization of lactose, whey protein concentrate, or cream. Obviously, the milk base may originate from any mammal, e.g. being substantially pure mammalian milk, or reconstituted milk powder.

Preferably, at least part of the protein in the milk base is proteins naturally occurring in milk, such as casein or whey protein. However, part of the protein may be proteins which are not naturally occurring in milk.

Prior to fermentation, the milk base may be homogenized and pasteurized according to methods known in the art.

"Homogenizing" as used herein means intensive mixing to obtain a soluble suspension or emulsion. If homogenization is performed prior to fermentation, it may be performed so as to break up the milk fat into smaller sizes so that it no longer separates from the milk. This may be accomplished by forcing the milk at high pressure through small orifices.

"Pasteurizing" as used herein means treatment of the milk substrate to reduce or eliminate the presence of live organisms, such as microorganisms. Preferably, pasteurization is attained by maintaining a specified temperature for a specified period of time. The specified temperature is usually attained by heating. The temperature and duration may be selected in order to kill or inactivate certain bacteria, such as harmful bacteria. A rapid cooling step may follow.

In a preferred embodiment of the invention, the milk base used for the fermentation with the starter culture before the concentration step has a protein content of between 1% by weight (w/w) and 4.0% by weight (w/w), preferably between 1.2% by weight (w/w) and 3.9% by weight (w/w), more preferably between 1.4% by weight (w/w) and 3.8% by weight (w/w) preferably between 1.6% by weight (w/w) and 3.7% by weight (w/w), preferably between 1.8% by weight (w/w) and 3.6% by weight (w/w), and most preferably between 2.0% by weight (w/w) and 3.5% by weight (w/w).

In a preferred embodiment of the invention, the milk base used for the fermentation with the starter culture before the concentration step has a fat content of between 1% by weight (w/w) and 8.0% by weight (w/w), preferably between 1.2% by weight (w/w) and 7.0% by weight (w/w), more preferably between 1.4% by weight (w/w) and 6.0% by weight (w/w) preferably between 1.6% by weight (w/w) and 5.0% by weight (w/w), preferably between 1.8% by weight (w/w) and 4.5% by weight (w/w), and most preferably between 2.0% by weight (w/w) and 4.0% by weight (w/w).

In a preferred embodiment of the invention, the milk base used for the fermentation with the starter culture contains an additive selected from the group consisting of a grain; and a puree, a juice and a nectar obtained from a source selected from the group consisting of a fruit, a vegetable and a grain. The grain may e.g. be in the form of a grain flour.

Concentration Method and Concentrated First Milk Base

In a particular embodiment of the invention, the concentration method is selected from the group consisting of a membrane concentration method, filtration and separation.

In a more particular embodiment of the invention, the concentration method is a membrane concentration method. In a particular embodiment of the invention, the membrane concentration method is selected from the group consisting of reverse osmosis, ultrafiltration, diafiltration, microfiltration, dialysis and nanofiltration.

In a particular embodiment of the invention, the concentrated first milk base is concentrated to such a level that the Dry Matter (DM) content is between 30% and 45%, preferably between 32% and 43%, more preferably between 34% and 41%, and most preferably between 36% and 39%.

In a particular embodiment of the invention, the concentrated first milk base has a ratio of fat to protein of between 1.4 and 4.5, preferably between 1.8 and 4.1, more preferably between 2.2 and 3.7, and most preferably between 2.6 and 3.4.

First Starter Culture

In a particular embodiment of the invention, the EPS producing strain is selected from the group consisting of EPS producing lactic acid bacteria (LAB) strains from the order "Lactobacillales". Preferably, the starter culture comprises one or more EPS producing Lactic Acid Bacteria (LAB) strains selected from the group consisting of *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp.

In a particular embodiment of the process of the invention, the EPS producing strain is selected from the group consisting of a *Lactococcus lactis* strain, a strain of the genus *Leuconostoc*, a *Streptococcus thermophilus* strain, and a strain of the genus *Lactobacillus*.

The EPS producing strain of the first starter culture of the present invention may be any EPS producing strain, including mesophilic and thermophilic EPS producing strains.

The term "thermophile" herein refers to microorganisms that thrive best at temperatures above 35° C. The industrially most useful thermophilic bacteria include *Streptococcus* spp. and *Lactobacillus* spp. The term "thermophilic fermentation" herein refers to fermentation at a temperature above about 35° C., such as between about 35° C. to about 45° C.

The term "mesophile" herein refers to microorganisms that thrive best at moderate temperatures (15° C.-35° C.). The industrially most useful mesophilic bacteria include *Lactococcus* spp. and *Leuconostoc* spp. The term "mesophilic fermentation" herein refers to fermentation at a temperature between about 22° C. and about 35° C.

In a particular embodiment of the invention, the EPS producing strain is a thermophilic EPS producing strain. In a particular embodiment of the invention, the EPS producing strain is selected from the group consisting of a *Streptococcus thermophilus* strain and a strain of the genus *Lactobacillus*. In a particular embodiment of the invention, the EPS producing strain is selected from the group consisting of a

*Streptococcus thermophilus* strain and a *Lactobacillus delbrueckii* subsp. *bulgaricus* strain. In a particular embodiment of the invention, the starter culture comprises at least one EPS producing *Streptococcus thermophilus* strain and at least one EPS producing *Lactobacillus delbrueckii* subsp. *bulgaricus* strain. Such a starter culture is usually referred to as a yogurt starter culture.

In a particular embodiment of the invention, the EPS producing strain is a mesophilic EPS producing strain. In a particular embodiment of the invention, the EPS producing strain is selected from the group consisting of a *Lactococcus lactis* strain, a strain of the genus *Leuconostoc* and a *Lactococcus lactis* subsp. biovar. *diacetylactis* strain. In a particular embodiment of the invention, the starter culture comprises at least one EPS producing *Lactococcus lactis* strain and at least one EPS producing strain of the genus *Leuconostoc*. In a particular embodiment of the invention, the starter culture comprises at least one EPS producing *Lactococcus lactis* strain, at least one EPS producing strain of the genus *Leuconostoc* and at least one EPS producing *Lactococcus lactis* subsp. *lactis* biovar. *diacetylactis* strain.

In a particular embodiment of the invention, the *Lactococcus lactis* strain is selected from the group consisting of a *Lactococcus lactis* subsp. *lactis* and *Lactococcus lactis* subsp. *cremoris*.

In a particular embodiment of the invention, the first starter culture in addition to the EPS producing strain contains at least one non-EPS producing strain.

The non-EPS producing strain may be selected from the group consisting of non-EPS producing strains belonging to the same genus, species, subspecies and biovar., from which the EPS producing strain is selected.

In a particular embodiment of the invention, the non-EPS producing strain is selected from the group consisting of lactic acid bacteria strains from the order "Lactobacillales". Preferably, the starter culture comprises one or more Lactic Acid Bacteria (LAB) strains selected from the group consisting of *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp.

In a particular embodiment of the invention, the EPS producing strain of the genus *Leuconostoc* is selected from the group consisting of *Leuconostoc mesenteroides*.

In a particular embodiment of the invention, the EPS producing lactic acid bacterium is selected from the group consisting of the *Leuconostoc mesenteroides* strains DSM 32861, DSM 32862, DSM 32863, DSM 32864, DSM 32865 and DSM 32866.

In a preferred embodiment of the invention, the starter culture has such a texturizing capacity so that in a fermentation at a temperature of 43° C. to an end Ph of 4.3 of a milk substrate, which contains 6.8% protein and 3.0% fat, is capable of generating a starter culture fermented milk product with a shear stress measured at 300 1/s of above 50 Pa, preferably above 60 Pa, more preferably above 70 Pa, and most preferably above 80 Pa.

In the process of the invention, it is preferred that the starter culture has an acidification capacity so that the fermented milk product reaches a pH of 4.6 in less than 12 hours, preferably less than 10 hours, more preferably less than 9 hours, more preferably less than 8 hours, and most preferably less than 7 hours.

In the process of the invention, it is preferred that the starter culture has a low level of post-acidification at the target pH. In a preferred embodiment of the invention, the starter culture in a fermentation of a milk substrate, which contains 6.8% protein and 3.0% milk fat, after reaching a target pH of 4.6 generates a post-acidification of below 0.30 pH units in 24 hours, preferably below 0.25 pH units in 24 hours, more preferably below 0.20 pH units in 24 hours, more preferably below 0.15 pH units in 24 hours, more preferably below 0.10 pH units in 24 hours, and most preferably below 0.05 pH units in 24 hours.

Fermentation Step

"Fermentation" in the methods of the present invention means the conversion of carbohydrates into alcohols or acids through the metabolism of a microorganism. Preferably, fermentation in the methods of the invention comprises conversion of lactose to lactic acid.

Fermentation processes to be used in production of fermented milk products are well known and the person of skill in the art will know how to select suitable process conditions, such as temperature, oxygen, amount and characteristics of microorganism(s) and process time. Obviously, fermentation conditions are selected so as to support the achievement of the present invention, i.e. to obtain a dairy product in solid or liquid form (fermented milk product).

In a particular embodiment of the process of the invention, the target pH is from 3.80 to 4.80, preferably from 4.00 to 5.30, more preferably from 4.10 to 5.20, more preferably from 4.20 to 5.10, more preferably from 4.30 to 5.00, and most preferably from 4.40 to 4.90.

In a particular embodiment of the invention, the target pH is reached in a period of less than 12 hours, preferably less than 10 hours, more preferably less than 9 hours, more preferably less than 8 hours, and most preferably less than 7 hours.

In a preferred embodiment the concentration of starter culture inoculated is from $10^4$ to $10^9$ CFU cells per ml of milk base, such as from $10^4$ CFU to $10^8$ CFU cells per ml of milk base.

EPS-Containing Fermented Milk Composition

In a particular embodiment of the invention, the EPS-containing fermented milk composition produced in step d) has a shear stress of from 100 Pa to 200 Pa, preferably between 110 Pa and 190 Pa, more preferably between 120 Pa and 180 Pa, more preferably between 130 Pa and 170 Pa, and most preferably between 140 Pa and 160 Pa.

In a particular embodiment of the invention the EPS-containing fermented milk composition contains at least 10%, preferably at least 12.0%, preferably at least 14.0%, preferably at least 16.0%, preferably at least 18.0%, preferably at least 20.0%, preferably at least 22.0%, preferably at least 24.0%, and most preferably at least 26.0%, milk fat. In a particular embodiment of the invention the EPS-containing fermented milk composition contains from 10.0% to 40.0%, preferably between 12.0% and 38.0%, more preferably between 16.0% and 34%, more preferably between 18.0% and 32%, more preferably between 20.0% and 30%, and most preferably between 22.0% and 28%, milk fat. In the first aspect of the invention, the milk fat content is relatively high, because no further milk base is added to soft cheese product to be produced, either in the form of a milk fat composition or in the form of a second fermented milk composition.

Additives of the Cream Cheese

In a particular embodiment of the invention, the EPS-containing fermented milk composition is in step e) further mixed with one or more ingredients selected from the group consisting of salt, texturizing agents, flavors, a protein composition and a vegetable oil.

In a particular embodiment of the invention, the product of the invention does not contain any further texturizing agent in addition to the EPS formed by the EPS producing strains.

In a particular embodiment of the invention, the product of the invention does contain at least one further texturizing agent in addition to the EPS formed by the EPS producing strains. In a particular embodiment of the invention, the further texturizing agent is selected from the group consisting of a thickener and a stabilizer. In a particular embodiment of the invention, the further texturizing agent is selected from the group consisting of starch, modified starch, gellan gum, pectin, alginate, agar agar, guar gum, xanthan gum, Locust Bean Gum (LBG, carob gum), carrageenan, gelatin and Whey Proteins, e.g. Whey Protein Concentrate (WPC). In a particular embodiment of the invention, the further texturizing agent is present in an amount of below 5.0%, preferably below 4.6%, more preferably below 4.2%, more preferably below 3.8%, more preferably below 3.4%, more preferably below 3.0%, and most preferably below 2.6%.

In a particular embodiment of the invention, the amount of texturizing agent as compared to a conventional soft cheese with a corresponding composition, except from being produced solely with non-EPS producing LAB strain, is reduced to 50%, preferably 45%, more preferably 40%, more preferably 35%, more preferably 30%, more preferably 25%, more preferably 20%, more preferably 15%, more preferably 10%, and most preferably 5%.

Heat Treatment

The heat treatment of the fermented milk mixture may be carried out using any conventional method and equipment of heat treatment.

In a particular embodiment of the invention, the heat treatment is carried out in one step at a temperature of from 40° C. to 100° C., preferably from 45° C. to 95° C., more preferably from 50° C. to 90° C., and most preferably from 55° C. to 85° C.

In a particular embodiment of the invention, the heat treatment is carried out in one step for a period of time from 3 minutes to 20 minutes, preferably from 4 minutes to 18 minutes, more from 5 minutes to 16 minutes, more from 6 minutes to 14 minutes.

In a particular embodiment the heat treatment is carried out in two or more steps using different temperatures.

In a particular embodiment of the invention, the heat treatment is carried out in a method, wherein the fermented milk mixture is simultaneously being subjected to a mixing treatment. The purpose of the mixing treatment is to obtain a homogenous soft cheese product.

In a particular embodiment of the invention, the heat treatment is carried out in a method, wherein the fermented milk mixture is simultaneously being subjected to a shearing treatment. The purpose of the shearing treatment is to obtain a homogenous soft cheese product.

Second Aspect of the Invention: Using Two Milk-Derived Soft Cheese Bases, 1) an EPS-Containing Fermented Milk Composition and 2) a Milk Fat Composition In a particular embodiment of the invention, a milk fat composition is added in any of steps a) to e). In a particular embodiment of the invention, the milk fat composition is added to the first milk base in step a). In a particular embodiment of the invention, the milk fat composition is added to the EPS-containing fermented milk composition in step e).

In a particular embodiment of the invention, the one or more other ingredients include a milk fat composition. In a particular embodiment of the invention, the milk fat composition is selected from the group consisting of milk cream, butter and butter oil.

Milk Fat Composition

In a particular embodiment of the invention, the milk fat composition to be added in any of steps a) to e) contains at least 8%, preferably at least 11.0%, preferably at least 14.0%, preferably at least 17.0%, preferably at 20.0%, preferably at least 23.0%, preferably at least 26.0%, preferably at least 29.0%, and most preferably at least 32.0% milk fat. In a particular embodiment of the invention, the milk fat composition to be added in any of steps a) to e) contains from 8.0 to 40.0%, preferably from 11.0% to 37.0%, more preferably from 14.0% to 34.0%, more preferably from 17.0% to 31.0%, and most preferably from 20.0% to 28.0% milk fat.

In a particular embodiment of the invention, the milk fat composition of the invention may be obtained by a process comprising the steps of
 a) providing a milk base, and
 b) concentrating the milk base to obtain a milk fat composition with the desired level of milk fat.

In a particular embodiment of the invention, the milk fat composition of the invention may be obtained by a process comprising the steps of
 a) providing a milk base, and
 b) separating the milk fat from the milk base to obtain a milk fat composition with the desired level of milk fat.

EPS-Containing Fermented Milk Composition

In the second aspect of the invention, it is possible to use a lower milk fat level in the EPS-containing fermented milk composition than in the first aspect, because a milk fat composition is added to form part of the final soft cheese product.

In a particular embodiment of the invention the EPS-containing fermented milk composition contains at least 1.0%, preferably at least 2.0%, preferably at least 3.0%, preferably at least 4.0%, preferably at least 5.0%, preferably at least 6.0%, preferably at least 7.0%, preferably at least 8.0%, preferably at least 9.0%, and most preferably at least 10.0%, milk fat. In a particular embodiment of the invention, the EPS-containing fermented milk composition has a milk fat content of from 1.0 to 30.0%, preferably from 2.0% to 26.0%, more preferably from 3.0% to 22.0%, more preferably from 4.0% to 18.0%, and most preferably from 5.0% to 14.0% milk fat. In particular, the composition of the first milk base and the level of concentration of the first milk base is selected so as to obtain the said fat content in the EPS-containing fermented milk composition.

Other Process Conditions of the Second Aspect of the Invention

Except for the above, all other information given above in relation to the first aspect of the invention, also apply to the second aspect of the invention.

Third Aspect of the Invention: Using Two Milk-Derived Soft Cheese Bases, 1) an EPS-Containing Fermented Milk Composition and 2) a Second Fermented Milk Composition In a particular embodiment of the invention the one or more other ingredients includes a second fermented milk composition.

In a particular embodiment of the invention, the second fermented milk composition is produced by a process comprising the steps of
 a) Providing a second milk base and adding a second starter culture comprising at least one *Lactococcus lactis* strain, and b) Fermenting the second milk base for a period of time until a target pH is reached to obtain a second fermented milk composition.

Second Milk Base

The second milk base for use for producing a second fermented milk composition may be any milk base, which is suitable for producing a conventional soft cheese produced solely with non-EPS producing LAB strains.

In a particular embodiment of the invention, the second milk base has a milk fat content of from 1.0% to 30.0%, preferably from 2.0% to 26.0%, more preferably from 3.0% to 22.0%, more preferably from 4.0% to 18.0%, and most preferably from 5.0% to 14.0% milk fat.

In a particular embodiment of the invention, the second milk base has a milk protein content of from 1.0 to 5.0%, preferably from 1.2% to 4.6%, more preferably from 1.4% to 4.2%, more preferably from 1.6% to 3.8%, more preferably from 1.8% to 3.4%, and most preferably from 2.0% to 3.0% milk protein.

Second Starter Culture

In a particular embodiment of the present invention, the second starter culture in addition to the *Lactococcus lactis* strain contains at least one further strain selected from the group consisting of a strain from the genus of *Leuconostoc*, a *Lactococcus lactis* subsp. biovar. *diacetylactis* strain, a *Streptococcus thermophilus* strain, and strain of the genus *Lactobacillus*, incl. *Lactobacillus rhamnosus*, *Lactobacillus paracasei*, and *Lactobacillus delbrueckii* subsp. *bulgaricus*.

In a particular embodiment of the invention, the further strain of the second starter culture is a mesophilic strain.

In a particular embodiment of the invention, the second starter culture comprises at least one further strain selected from the group consisting of strains of the genus *Leuconostoc*. In a particular embodiment of the invention, the second starter culture comprises at least one further strain selected from the group consisting of strains of the genus *Leuconostoc* and at least one further strain selected from the group of *Lactococcus lactis* subsp. *lactis* biovar. *diacetylactis* strains.

In a particular embodiment of the invention, the strain of the genus *Leuconostoc* is selected from the group consisting of *Leuconostoc mesenteroides* strains.

Second Fermented Milk Composition

Preferably, the function of the second fermented milk product is to provide aroma and flavor to the soft cheese product of the invention.

In a particular embodiment of the invention, the second fermented milk composition has an aroma profile, which corresponds to a conventional soft cheese product. In a particular embodiment of the invention, the second fermented milk composition is produced by a process, which is conventionally used to produce a soft cheese product.

In a particular embodiment of the invention, the second fermented milk composition has a milk fat content of from 1.0% to 30.0%, preferably from 2.0% to 26.0%, more preferably from 3.0% to 22.0%, more preferably from 4.0% to 18.0%, and most preferably from 5.0% to 14.0% milk fat. The milk fat helps to prevent degradation of the aroma and flavor components, and hence it is desired to use as high a fat content as possible.

EPS-Containing Fermented Milk Composition

In the third aspect of the invention, it is possible to use a lower milk fat level in the EPS-containing fermented milk composition than in the first aspect, because a second fermented milk composition is added to form part of the final soft cheese product.

In a particular embodiment of the invention the EPS-containing fermented milk composition contains at least 1.0%, preferably at least 2.0%, preferably at least 3.0%, preferably at least 4.0%, preferably at least 5.0%, preferably at least 6.0%, preferably at least 7.0%, preferably at least 8.0%, preferably at least 9.0%, and most preferably at least 10.0% milk fat. In a particular embodiment of the invention, the EPS-containing fermented milk composition has a milk fat content of from 1.0 to 30.0%, preferably from 2.0% to 26.0%, more preferably from 3.0% to 22.0%, more preferably from 4.0% to 18.0%, and most preferably from 5.0% to 14.0% milk fat. In particular, the composition of the first milk base and the level of concentration of the first milk base is selected so as to obtain the said fat content in the EPS-containing fermented milk composition.

Other Process Conditions of the Third Aspect of the Invention

Except for the above, all other information given above in relation to the first aspect of the invention, also apply to the second aspect of the invention.

Fermented Milk Soft Cheese Product of the Invention

The present invention further relates to a fermented milk soft cheese product containing at least one EPS producing lactic acid bacterium strain.

The expression "fermented milk soft cheese product" refers to any cheese product having a Dry Matter (DM) content of between 30% and 45% and a ratio of fat to protein of between 1.4 and 4.5.

In a particular embodiment of the invention, the fermented milk soft cheese product is selected from the group consisting of cottage cheese, curd cheese, farmer cheese, cas, chhena, fromage blanc, queso fresco, paneer and labneh.

Use of the Invention

The present invention further relates to the use of an EPS producing lactic acid bacterium strain for producing a fermented milk soft cheese product.

Definitions

In connection with the present invention the terms and expressions listed below have the following meaning:

The expression "EPS" means exopolysaccharide. Exopolysaccharides are polysaccharides produced by the bacteria and exported out of the cell and released from the bacteria cells into the surrounding medium. Exopolysaccharides may be homologues, i.e. consisting of the same monosaccharides, or heterogenous, i.e. consisting of two or more different monosaccharides. Heteropolysaccharides are usually composed of repeating units composed of from 2 to 7 monosaccharides.

The expression "CPS" means capsular polysaccharide. Capsular polysaccharides are polysaccharides produced by the bacteria and exported out of the cell and remain linked to the surface of the bacteria cells. Capsular polysaccharides may be homologues, i.e. consisting of the same monosaccharides, or heterogenous, i.e. consisting of two or more different monosaccharides. Heteropolysaccharides are usually composed of repeating units composed of from 2 to 7 monosaccharides.

The expression "EPS producing lactic acid bacterium strain" means any strain, which produces EPS and/or CPS.

The expression "concentrated milk base" means a milk base obtained in step b) of the process of the invention.

The expression "lactic acid bacteria" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. These are frequently used as food cultures alone or in combination with other lactic acid bacteria.

Lactic acid bacteria, including bacteria of the species *Lactobacillus* sp. and *Lactococcus* sp., are normally supplied to the dairy industry either as frozen or freeze-dried cultures for bulk starter propagation or as so-called "Direct Vat Set" (DVS) cultures, intended for direct inoculation into a fermentation vessel or vat for the production of a dairy product, such as a fermented milk product or a cheese. Such lactic acid bacterial cultures are in general referred to as "starter cultures" or "starters".

In the present context the term "fruit juice" refers to the liquid naturally contained in fruit prepared by mechanically squeezing or macerating fresh fruits without the presence of heat and solvents. The "fruit juice" may consist of juice from one type of fruit or a mixture of more than one type of fruit. The "fruit juice" may be either one containing pulp, or one from which the pulp has been removed by such an operation as centrifugation.

The term "nectar" in the present context refers to a beverage having a fruit juice content of between 30% to 99% fruit juice.

In the present context the term "puree" refers to fruits prepared by grounding, pressing and/or straining into the consistency of a thick liquid or a soft paste without the presence of heat and solvents. "Puree" is made of 100% fruit as opposed to being made from just the juice of the fruit.

The term "target pH" means the pH at which the fermentation is deemed to be finished, and from the point in time at which the target pH is reached the starter culture fermented milk product is ready for further processing, e.g. heat treatment.

The term "grain" means any product obtained from a cereal or grain biological source material, including oat, corn, barley, rye, buckwheat, wheat and rice.

The expression "X.X×10expYY" and "X.XEYY", both mean $X.X \times 10^{YY}$, and the two said expressions are used interchangeably.

The expression "CFU" means Colony Forming Units.

The term "B-milk" means re-constituted milk with a dry matter content of 9.5%, which has been heat treated to 99° C. for 30 minutes in a batch process.

In connection with the present invention, the term "shear stress" means shear stress as measured by the following method:

The day after incubation, the fermented milk product was brought to 13° C. and manually stirred gently by means of a stick fitted with a perforated disc until homogeneity of the sample. The rheological properties of the sample were assessed on a rheometer (Anton Paar Physica Rheometer with ASC, Automatic Sample Changer, Anton Paar® GmbH, Austria) by using a bob-cup. The rheometer was set to a constant temperature of 13° C. during the time of measurement. Settings were as follows:

Holding time (to rebuild to somewhat original structure) 5 minutes without any physical stress (oscillation or rotation) applied to the sample.

Oscillation step (to measure the elastic and viscous modulus, G' and G", respectively, therefore calculating the complex modulus G*)

Constant strain=0.3%, frequency (f)=[0.5 . . . 8] Hz
6 measuring points over 60 s (one every 10 s)
Rotation step (to measure shear stress at 300 1/s)

Two steps were designed:
1) Shear rate=[0.3-300] 1/s and 2) Shear rate=[275-0.3] 1/s.

Each step contained 21 measuring points over 210 s (on every 10 s).

The shear stress at 300 1/s was chosen for further analysis, as this correlates to mouth thickness when swallowing a fermented milk product.

In connection with the present invention, the term "gel firmness" means gel firmness as measured by the following method:

A back extrusion test was conducted to evaluate gel firmness. The samples were tempered to be 13° C. for one hour prior to shear stress measurements. Stirring with spoon was applied to give a homogenous sample, i.e. stirring five times. Measurement was done by TA-XT plus, software Texture Expert Exceed v6.1.9.0. A cylindrical acrylic probe (0 40 mm) penetrated the yogurt to a depth of 15 mm with a speed of 2 mm/s and a trigger force of 5 g. The positive area was used as firmness measurement.

EXAMPLES

Example 1: Production of Cream Cheese Using One Culture Containing an EPS Producing *Leuconostoc* and Two Commercial Cultures Containing Multiple EPS Producing Strains (Yoflex Premium 3.0 and Yoflex Creamy 1.0)

This Example relates to a process according to the second aspect of the present invention, i.e. a process, wherein a milk fat composition is added to EPS containing fermented milk composition. Furthermore, no concentration of the milk base is carried out. The purpose of the experiment is to test whether it is possible to produce a cream cheese without adding any texturizing agent in addition to the EPS produced by the EPS producing lactic acid bacterium strains.

Cultures Tested

Three cultures were tested:
1. *Leuconostoc* culture: The culture is composed of EPS producing *Leuconostoc mesenteroides* DSM 32866 and *Lactococcus lactis* subsp. *lactis* DSM 24650. *Leuconostoc* DSM 32866 is a high homopolysaccharide producer. Milk base 1 was used.
2. Yoflex Premium 3.0: The culture contains a combination of multiple EPS-producing *Streptococcus thermophilus* and *Lactobacillus delbrueckii* subsp. *bulgaricus* strains. The EPS producing strains are high heteropolysaccharide producers. Milk base 1 was used.
3. Yoflex Creamy 1.0: The culture contains a combination of multiple EPS-producing *Streptococcus thermophilus* and *Lactobacillus delbrueckii* subsp. *bulgaricus* strains. The EPS producing strains are high heteropolysaccharide producers. Milk base 2 was used.

Milk Bases

TABLE 1

| Milk base 1 | | | | |
| --- | --- | --- | --- | --- |
| | Amount (kg) | Fat | Protein | Carbohydrate |
| Whole milk (3.39%) | 47.57 | 0.05% | 33.39% | 4.78% |
| Cream | 5.13 | 32.0% | 2.0% | 0.0% |
| Promilk SH20 | 2.30 | 0.25% | 89.85% | 3.0% |
| Milk base | 55.0 | 30.3 g/l | 68.7 g/l | ND |

TABLE 2

| | Milk base 2 | | | |
|---|---|---|---|---|
| | Amount (kg) | Fat | Protein | Carbohydrate |
| Whole milk (3.39%) | 4.21 | 0.05% | 33.39% | 4.78% |
| Cream | 53.42 | 32.0% | 2.0% | 0.0% |
| Promilk SH20 | 2.375 | 0.25% | 89.85% | 3.0% |
| Milk base | 60.05 | 285.0 g/l | 55.7 g/l | ND |

Fermentation

For the *Leuconostoc* culture, the fermentation was carried out at a temperature of 22° C. For Yoflex Premium 3.0 and Creamy 1.0, the fermentation was carried out at a temperature of 43° C. For all cultures the fermentation was continued until an end pH of 4.60 was reached.

Mixing with Milk Fat Composition and Heating Treatment

The three fermented milk compositions (79.5%) were mixed with MGLA (19.9%) and 0.6% salt. No texturizing agent or other additives was added to any of the two fermented milk compositions. The term "MGLA" ("Matière grasse laitière anhydre") means anhydrous milk fat, also referred to as concentrated butter, and it contains at least 99.8% milk fat. The mixing was carried out in a cooker (Q6015-3 from Cadixpro). The cooker is a shearing and heating equipment, which allows mixing of the ingredients of the cream cheese. The cooker was operated with the following parameters: Heat rise to 85° C. at 750 rpm, followed by 5 minutes at 1500 rpm, and then cooling to 75° C. Then, the cream cheeses were transferred to a small laboratory homogenizer and homogenized at 200/50 bar and then packed.

Results

The three cream cheeses produced were evaluated by means of a visual inspection of the texture of the cream cheese and firmness as well as a sensory evaluation of the taste.

The three cream cheeses produced had an acceptable level of texture and firmness as desired, which was obtained solely by the use of EPS producing strains, as no additional texturizing agent was added to the process. Furthermore, the taste profile was agreeable and as desired.

Example 2: Production of Cream Cheese Using Three Different Culture Blends Containing One or More EPS Producing Strains This Example relates to a process according to the second aspect of the present invention, i.e. a process, wherein a milk fat composition (melted butter) is added to the first milk base. Furthermore, no concentration of the milk base is carried out. The purpose of the experiment is to test whether it is possible to produce a cream cheese without adding any texturizing agent in addition to the EPS produced by the EPS producing lactic acid bacterium strains.

Cultures Tested

Three culture blends were tested:

1. Culture 1: The culture contains a combination of multiple EPS-producing *Streptococcus thermophilus* and *Lactobacillus delbrueckii* subsp. *bulgaricus* strains. The EPS producing strains are high heteropolysaccharide producers. Furthermore, the culture contains a non-EPS producing *Lactococcus lactis* subsp. *lactis* biovar. *diacetylactis* strain. Fermentation temperature: 43° C.
2. Culture 2: The culture contains a combination of multiple EPS-producing *Streptococcus thermophilus* and *Lactobacillus delbrueckii* subsp. *bulgaricus* strains. The EPS producing strains are high heteropolysaccharide producers. Fermentation temperature: 43° C.
3. Culture 3: The culture contains an EPS-producing *Streptococcus thermophilus*, a non-EPS producing *Lactococcus lactis* strain, and a non-EPS producing *Lactococcus lactis* subsp. *lactis* biovar. *diacetylactis* strain. Fermentation temperature: 34° C.
4. Culture 4 (Reference): The culture contains only non-EPS producing strains: A *Lactococcus lactis* strain, a *Leuconostoc* strain, *Lactococcus lactis* subsp. *lactis* biovar. *diacetylactis* strain. Fermentation temperature: 26° C.

Milk Base

TABLE 3

| | Milk base | | |
|---|---|---|---|
| Ingredient | Amount (% w/w) | Fat (%) | Protein (%) |
| Butter | 46.40394 | 38.469 | 0.25 |
| Culture | 0.08337 | 0 | 0 |
| Whey Protein Concentrate (WPC) | 1.28211 | 0.096 | 1.026 |
| Milk Protein Concentrate (MPC) 80 | 6.09801 | 0.152 | 4.939 |
| Whey powder | 2.38204 | 0.036 | 0.262 |
| Water | 43.75053 | 0 | 0 |
| Total | 100.00 | 38.753 | 6.477 |

Measurements pH was measured after 15 hours of fermentation.

Shear stress and gel firmness were measured after seven days of storage. Shear stress was measured at shear rates 30.2/s and 300/s.

Measurement of Time to pH

The acidification of each sample was followed continuously by Cinac equipment.

Shear Stress Measurement

Seven days after production, the fermented milk product was brought to 13° C. and manually stirred gently by means of a spoon until homogeneity of the sample. The rheological properties of the sample were assessed on a rheometer (Anton Paar Physica Rheometer with ASC, Automatic Sample Changer, Anton Paar® GmbH, Austria) by using a concentric cylinder. The rheometer was set to a constant temperature of 13° C. during the time of measurement. Settings were as follows:

Holding time (to rebuild to somewhat original structure)

3 minutes without any physical stress (oscillation or rotation) applied to the sample.

Oscillation step (to measure the elastic and viscous modulus, G' and G", respectively, therefore calculating the complex modulus G*)

Constant strain=0.3%, frequency (f)=[0.5 . . . 8] Hz 6 measuring points over 60 s (one every 10 s)

Rotation step (to measure shear stress at 300 1/s)

Two steps were designed:

Shear rate=[0.271–300] 1/s and 2) Shear rate=[275–0.271] 1/s.

Each step contained 21 measuring points over 210 s (on every 10 s).

The shear stress at the selected points of the flow curves was chosen for further analysis.

The Complex Modulus G* is a parameter, which is correlated to Gel Stiffness.

Gel Firmness Measurement—Positive Compression Area

A back-extrusion test was conducted to evaluate gel firmness. The samples were tempered to be 13° C. for one hour prior to shear stress measurements. Stirring with spoon was applied to give a homogenous sample, i.e. stirring five times. Measurement was done by TA-XT plus, software Texture Expert Exceed v6.1.9.0. A cylindrical acrylic probe (0 40 mm) penetrated the yogurt to a depth of 15 mm with a speed of 2 mm/s and a trigger force of 5 g. The positive area was used as a gel firmness measurement.

Process

The water of the milk base was heated to a temperature of between 55° C. and 65° C., and the powdered ingredients and the butter was mixed into the water. The mixture was homogenized at 70 bar and heated to 92° C. for 5 minutes and then cooled to the fermentation temperature. The milk base was inoculated with the culture blend and fermented at the fermentation temperature for 15 hours.

After fermentation the fermented milk product was stirred and heated in a QB015-3 cooker (CadixPRO) in a first step at 55° C. for 5 minutes at 800 rpm and in a second step at 85° C. for 11 minutes at 1500 rpm. The heat-treated product was then homogenized at 140 bar at 80-85° C.

Then the products were cooled for 2 hours at ambient temperature and finally stored in sealed cups at 6° C. for 7 days.

Results

| Experiment | pH | Shear stress at 30.2/s (Pa) | Shear stress at 300/s (Pa) | Gel Firmness (g) |
|---|---|---|---|---|
| Culture 1 | 4.80 | 125 | 230 | 76 |
| Culture 2 | 4.55 | 87.5 | 168 | 66 |
| Culture 3 | 4.55 | 86.9 | 166 | 57 |
| Culture 4 | 4.55 | 52.8 | 114 | 35 |

As will appear from the above results, the cream cheeses produced with cultures 1 to 3 have a high level of texture, i.e. a level which meets the requirements of commercial cream cheeses. Thus, the present experiments have shown that it is possible to produce cream cheese with a required level of texture solely by means of a culture blend comprising EPS producing strain, i.e. it is possible to avoid the use of texturizing additives.

Furthermore, as will appear from the above results, the cream cheeses produced with cultures 1 to 3 containing one or more EPS producing strains have a level of texture, which is significantly higher than that of the reference culture containing no EPS producing strain.

The invention claimed is:

1. A process for producing a fermented milk soft cheese product, comprising:
   (a) adding a first starter culture comprising at least one EPS-producing lactic acid bacterium strain to a first milk base having a ratio of fat to protein of 1.4:1 to 4.5:1,
   (b) fermenting the first milk base for a period of time until a target pH is reached to obtain an EPS-containing fermented milk composition, and
   (c) co subjecting the EPS-containing fermented milk composition to heat treatment to obtain a fermented milk soft cheese product, wherein no added texturizing agents are used in the process.

2. A process according to claim 1, wherein no milk fat composition and no second fermented milk composition are added to the first milk base or to the EPS-containing fermented milk composition in the process.

3. A process according to claim 1, further comprising, prior to step (a), concentrating a milk composition to obtain the first milk base.

4. A process according to claim 1, wherein the first milk base has a Dry Matter (DM) content between 30% and 45%.

5. A process according to claim 1, wherein the EPS-containing fermented milk composition contains from 10.0% to 40.0% milk fat.

6. A process according to claim 1, further comprising mixing the EPS-containing fermented milk composition with a milk fat composition.

7. A process according to claim 6, wherein the milk fat composition is selected from the group consisting of milk cream, butter and butter oil.

8. A process according to claim 1, further comprising mixing the EPS-containing fermented milk composition with a second fermented milk composition.

9. A process according to claim 8, wherein the second fermented milk composition is produced by a process comprising:
   (a) adding a second starter culture comprising at least one *Lactococcus lactis* strain to a second milk base, and
   (b) fermenting the second milk base for a period of time until a target pH is reached to obtain the second fermented milk composition.

10. A process according to claim 9, wherein the second starter culture further comprises at least one further strain selected from a *Leuconostoc* strain a *Lactococcus lactis* subsp. biovar. *diacetylactis* strain, a *Streptococcus thermophilus* strain, and a *Lactobacillus* strain.

11. A process according to claim 1, further comprising, prior to step (c), mixing the EPS-containing fermented milk composition with one or more additives selected from salt, flavors, and a vegetable oil.

12. A process according to claim 3, wherein concentrating the milk composition comprises subjecting the milk composition to a concentration step selected from a membrane concentration method, filtration, and separation.

13. A process according to claim 1, wherein the EPS-producing strain comprises a strain selected from a *Lactococcus lactis* strain, a *Leuconostoc* strain, a *Streptococcus thermophilus* strain, and a *Lactobacillus* strain.

14. A process according to claim 1, wherein the EPS-producing strain comprises a strain selected from the *Leuconostoc mesenteroides* strains deposited at the Leibniz Institute DSMZ-German Collection of Microorganisms and Cell Culture (DSMZ) under the following accession numbers: DSM 32861, DSM 32862, DSM 32863, DSM 32864, DSM 32865, and DSM 32866.

15. A process according to claim 1, wherein the first starter culture further comprises at least one non-EPS producing strain.

16. A fermented milk soft cheese product containing at least one EPS producing lactic acid bacterium strain, prepared by a process according to claim 1, wherein the product does not include added texturizing agents.

17. The fermented milk soft cheese product according to claim 16, wherein the at least one EPS producing lactic acid bacterium strain comprises a strain selected from the *Leuconostoc mesenteroides* strains deposited at the DSMZ under the following accession numbers: DSM 32861, DSM 32862, DSM 32863, DSM 32864, DSM 32865, and DSM 32866.

* * * * *